Patented Apr. 29, 1947

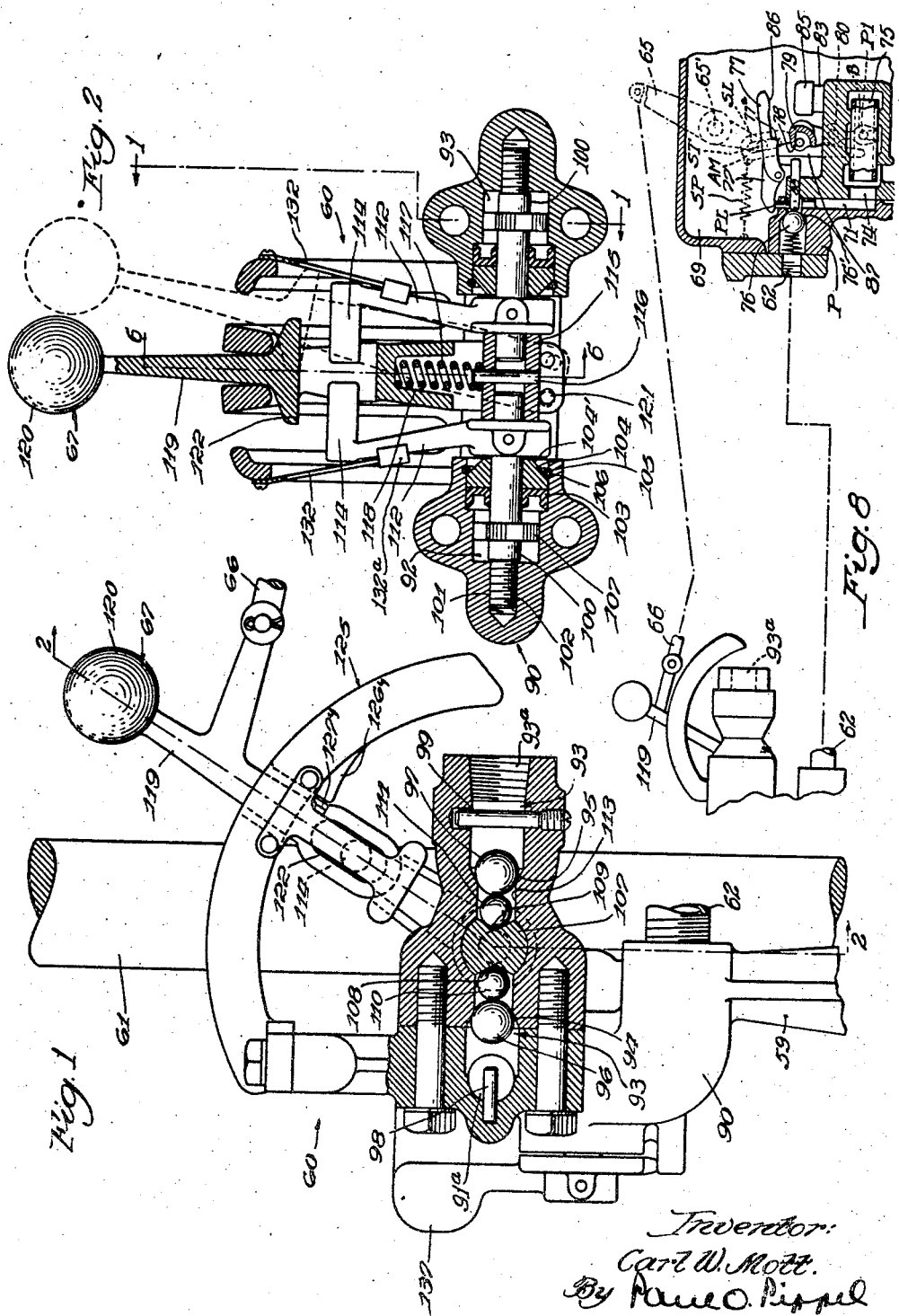

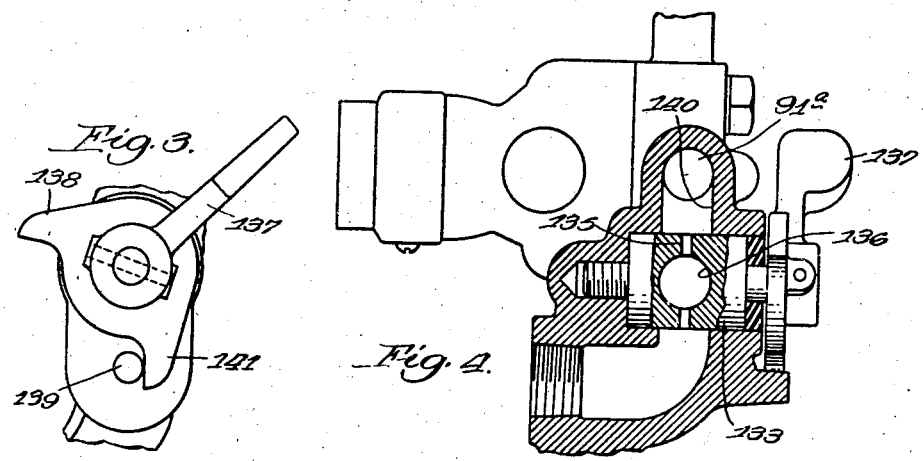
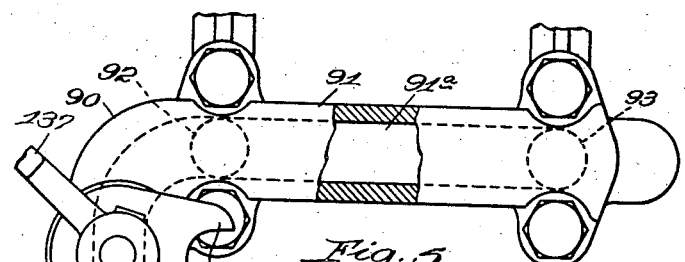
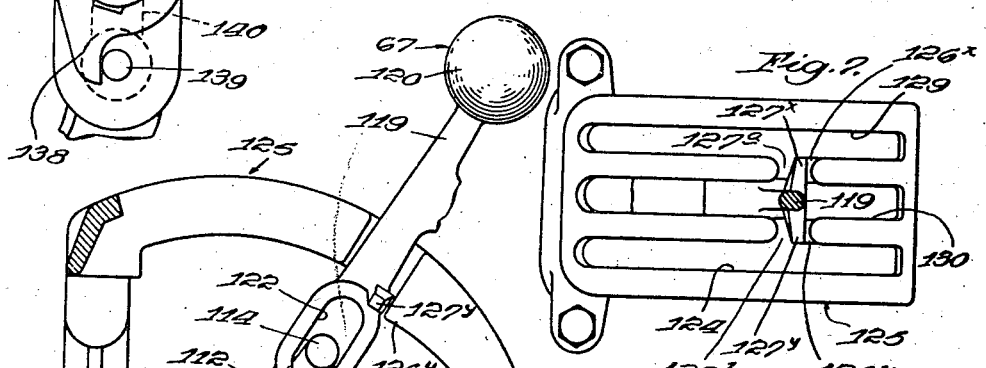
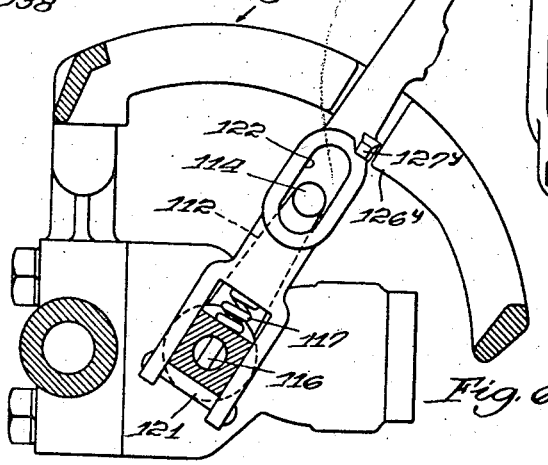

2,419,908

UNITED STATES PATENT OFFICE 2,419,908

SELECTIVE VALVE MECHANISM FOR HYDRAULIC MOTORS

Carl W. Mott, La Grange, Ill., assignor to International Harvester Company, a corporation of New Jersey Original application October 2, 1941, Serial No. 413,293, now Patent No. 2,337,764, dated December 28, 1943. Divided and this application June 30, 1943, Serial No. 492,859

5 Claims. (Cl. 60—52)

This invention has to do with a valve mechanism for controlling the admission and exhaust of fluid to and from fluid energizable motors to enable an operator to expediently select and control the starting and stopping of such motors.

While the present valve mechanism is particularly useful for selectively controlling the adjustment of fluid-motor adjusted tools upon a motor-propelled vehicle, as shown in copending application Serial No. 413,293, now Patent No. 2,337,764, of which this application is a division, other specific use for this and other embodiments of the invention will be apparent to those skilled in the art of hydraulic controls.

An important general object of the invention is the provision of a valve mechanism operable to control the motor for a plurality of motor-driven parts, and said mechanism including a control lever having motor-selecting positions geometrically correlative with the positions of said parts driven thereby.

A further general object of this invention is the provision of a selective control valve installable upon a motor-driven, movable-part-carrying unit equipped with a fluid pressure-differential source, whereby the unit is easily converted into one whereon the parts are selectively controllable.

Still a further object is the provision of a control valve arrangement in which there are by-pass and selector valves manually settable together and automatically released upon the attainment of a predetermined pressure in the system, thereby adapting the arrangement for use in a hydraulic system supplied with operating liquid by a constantly driven pump.

These and other desirable, more specific objects inherent in and encompassed by the invention will be better understood from the ensuing portion of this specification together with the annexed drawings, wherein:

Figure 1 is a view in elevation and partly in section, on the line 1—1 of Figure 2, of the combined collective and selective valve control unit;

Figure 2 is a vertical sectional view taken along the line 2—2 of Figure 1;

Figure 3 is a view in elevation of a control for a throttling valve shown in Figure 4;

Figure 4 is a view taken in longitudinal section through the throttling valve, of which the control is shown in Figure 3;

Figure 5 is a detail view of the throttling valve control or operating means located in a different adjustment from that shown in Figure 3;

Figure 6 is a view in elevation and in detail of the manually-operable control element as taken along the line 6—6 of Figure 2;

Figure 7 is a top plan view of a guide-slot frame for guiding the manually-operable control element; and Figure 8 is a partly diagrammatic view illustrating that part of the mechanism associated with a pump, together with the mechanism of Figures 1 and 2 and the conduit and operating link connections therebetween.

With continued reference to the drawings, in Figure 1 a housing 90 of the valve mechanism 60 is shown having a bracket portion 59 attached by any standard means to a supporting standard 61. Fluid, such as oil under pressure, from a source, as that shown in said copending application and under control of a lever 119 through a link 66, can enter the housing 90 which has a laterally extending communicating portion 91 containing a channel 91ª, from which the fluid is distributed through a pair of forwardly extending fluid passages 92 and 93. These fluid passages 92 and 93 are laterally spaced with respect to each other and each has a valve arrangement and its associated operating means. Conduits (not shown) are connectable with threaded outer end portions, as 93ª, of the passages 92 and 93 for leading to respective part-operating motors.

Each of the fluid passages 92 and 93 has opposite valve seats 94 and 95 against which there is seated respectively valve balls 96 and 97. These valve balls are normally held against the valve seats by fluid pressure. They are limited in their movement in the passages by retaining pins 98 and 99.

Axially rotatable spindle members 100 extend from a central position between the passages 92 and 93 outwardly respectively into and across said passages. Each spindle has a threaded outer end portion 101 threaded into a threaded recess 102 formed in the housing 90 (see Figure 2). By so threading the rotatable spindles 100 into the recesses 102, they are retained against axial movement and at the same time permitted to rotate. Seals are provided for the spindles 100 by sealing rings 103 retained in position by washers 104 and snap rings 105. The washers 104 have conical surfaces 104' which bear against the snap rings 105. By having these surfaces conical, a component of this force acts upon the snap rings 105 to urge the same into recesses 106 therefor in the housing rather than tending, as in the case of a flat washer, to unseat the snap rings. The rotatable members 100 have operating portions 107 respectively in the passages 92 and 93 but sufficiently thin axially of said members (see Figure 2) as not to materially obstruct said passages. These operating portions have countersunk recesses 108 and 109. These recesses are of sufficient depth to have fitted therein a part of balls 110 and 111 (see Figure 1). On each rotatable member 100, there is an operating arm 112. When either operating arm 112 is operated by means to be hereinafter described, the associated balls 110 and 111 are caused to move axially through their fluid communications 92 and 93, due to their confinement therein, to unseat the valve balls 96 and 97. Thereupon, the fluid which is delivered to the housing 90 through the communication 82, will pass to the motors (not shown) associated with the ports 93ª of the selectively opened valve or valves including the balls 96 and 97 and their valve seats 94 and 95. By employing pairs of opposite ball valves 96 and 97, fluid is not permitted to remain under pressure in intermediate sections 113 of the fluid passages 92 and 93. In this manner leakage of fluid, which would tend to pass the sealing rings 103, is kept to a minimum.

Each of the rotatable members 100 has an operating arm 112, each of which has a boss 114 arranged in transverse alinement with each other when both valves are in the same operating position. The rotatable members mutually carry a sleeve 115 from which there extends a pin 116. This pin serves as a means for stabilizing a coil spring 117 seated within a recess 118 of a single manually operable control element 119 having a handle portion 120 accessible to the operator. This element 119 is bifurcated at its lower end to fit about the sleeve 115 about which it is retained by means of pins 121. The control element is also provided with a slotted portion 122 arranged to receive the transversely extending bosses 114 of the operating arms 112.

The control element 119, being thus connected to the sleeve 115, can be moved or deflected laterally to either side to avoid operating relation with the transverse boss or portion 114 of either operating arm 112. This is illustrated by dotted lines in Figure 2, where the transversely extending portion 114 at the left is out of the slotted portion 122.

The control element or lever 119 is movable within a slotted guide-frame 125 therefor secured to the valve housing 90. Three fore and aft slots 124, 130, and 129 are provided in the frame 125, as is plainly shown in Figure 7. There is a transverse slot 127ª, through which the lever 119 is shiftable while in the neutral position, between the slots 129 and 130, and a transverse slot 127ᵇ, through which the lever is shiftable between the slots 124 and 130 while in the neutral position. Lugs 127ˣ and 127ʸ on the lever 119 are abuttable with stops 126ˣ and 126ʸ on the frame 125, to limit movement of the lever forwardly beyond the neutral position, excepting when a manual force is applied downwardly on the lever handle 67, to press the spring 117 sufficiently for displacing said lugs 127ˣ and 127ʸ below said stops. When the lever 119 is moved forwardly in any of the frame slots 124, 130, and 129 beyond the neutral position in which it is shown in Figure 7, it is operable through the link 66, Figures 1 and 8, for manipulating a check valve in a manner presently described to permit escape of the fluid from the actuated motor inwardly of the valve mechanism 60 through its associated port, as 93ª, and past the valve balls 96—97, which will then be unseated by their associated actuator 107, passage 81ª, and a conduit 82 to and past the aforesaid check valve for discharge back into the pump reservoir 69. The stops 126ˣ and 126ʸ are employed to prevent automatic movement of the control lever 119 forwardly beyond the neutral position under force received from an automatic pump control means, the description of which is begun in the next paragraph. Thus, after the lever 119 has been moved rearwardly to cause the introduction of actuating fluid into one or more of the associated motors, the control member 119 may be released for automatic return to the neutral position determined by the stops 126ˣ and 126ʸ.

As stated above, the valve mechanism 60 is adapted for operation in conjunction with a pump, shown in detail in the aforesaid Patent No. 2,337,764, having certain automatic control features which are shown herein only to the extent thought necessary to adequately disclose the present invention. Said pump, shown fragmentarily at P in Figure 8, is constantly driven and bypasses the fluid at low pressure through a port 74 back into a reservoir casing 69 therefor, excepting when a by-pass valve sleeve 75 is moved rearwardly (to the left as viewed in Figure 8) into the port 74. The by-pass valve sleeve 75 is shifted axially by a lever 79 pivoted at 80 and having bifurcations B connected with the sleeve by pins PI projecting radially therefrom. Rocking of the lever 79 for shifting the by-pass sleeve 75 is incurred by a stud ST slidable in a slot SL of an arm AM of such lever and this stud is carried on the lower end of a lever 65 pivoted at 65' on a reservoir wall. The link 66 connects the lever 65 with the control lever 119, so these two levers operate in concert.

Upon closing the by-pass valve 74—75 by backward movement of the link 66 when the control lever 119 is moved counter-clockwise from the neutral as viewed in Figures 1 and 8, sufficient pressure will be incurred in the pump discharge channel 71 to project a plunger PL upwardly against a latch lever 77 to pivot the same clockwise for dropping a latching face 77ª thereof behind a latching face 78 on the lever 79 (then pivoted clockwise from the position shown in Figure 8) to prevent opening of the by-pass valve 74—75 by a spring SP which tends to rotate the lever 79 counter-clockwise, though the lever 119 is released. Some of the fluid in the pump discharge passage 71 flows through the sleeve 75 to a pressure relief valve 83 which has a cap 85 movable upwardly against a pad 86 on the latch lever to unlatch the faces 77ª and 78 upon the attainment of a high pressure in the discharge channel when the motors reach a limit of their operating range. Until this high pressure is reached, the control lever 119 will remain in its backward position, but, when the latch faces 77ª and 78 are unlatched, the spring SP will rotate the lever 79 counter-clockwise, opening the by-pass valve 74—75, and will rotate the lever 65 clockwise, pulling the link 66 and the lever 119 forwardly to the neutral position determined by the stops 126ˣ—126ʸ on the lever guide frame 125.

The motor or motors which will have just been energized will remain in that condition until the lever 119 is pressed downwardly and moved forwardly past neutral as explained above. This forward movement of the lever 119 past the neutral position is effective through the link 66 and an extension 87 on the lever 79 to move a pin 88 rearwardly to open the aforesaid check valve in the pump by unseating its ball 76 from its seat 76'. This check valve is in series with the conduit 62 and the pump reservoir 69, so that upon the concurrent opening of the set or sets of valve balls 96—97 by the forward-past-neutral movement of lever 119, communication will be cleared between the energized motor or motors and the reservoir to permit discharge from the motor to the reservoir and return of parts associated with the deenergized motor or motors to an initial position.

It is emphasized that the present valve mechanism is installable as upon a tractor for converting a fluid power arrangement of a type adapted for simultaneous operation of working tools into a fluid power arrangement where either selective or simultaneous movement of the working tools located at opposite sides of the tractor can be effected, and that this effect is accomplished by a single operating lever accessible to the operator's station on the tractor. This control valve mechanism is of a type which can be connected to the tractor as a unit and only minimum effort is required for the attachment of the same with the usual fluid power arrangement.

Associated with this combined unit 60 is a throttle valve 133 having a small port 135 extending diametrically through the same in one direction and a large port 136 extending through the same at an angle of 90° with respect to the smaller port. This throttle valve element 133 is journaled in the housing 90 and can be turned through 90° by means of an operating handle 137 likewise accessible to the vehicle operator. Normally the operating lever 137 is in the position shown in Figure 5 with its lug portion 138 abutting a stop element 139 on the housing 90. With the throttle valve 133 turned to this position the large port 136 is alined with a vertically extending fluid passage 140 in the housing 90. When it is desired to effect slow power adjustment of the parts such as the aforesaid tillage tools, the throttle valve 136 is turned by the operating handle 137 until a lug 141 thereon abuts the stop 139. When the throttle valve 133 is turned to this position, the small port 135 is then alined with the passage 140. This port 135 will allow fluid to pass through the passage 140 at a slower rate. By the operator then utilizing the control element 119 in the manner already described, he may now effect a raising and lowering of the tools at a much reduced speed, whereby a delicate adjustment of the working tools can be effected. During this operation, the operator would continue to hold the handle 120 of the lever and, when the working tools have reached the position desired, the handle will be moved manually to its neutral position.

Operation of the device

In describing the operation of the device, it will be assumed to be incorporated into a fluid-medium power-operated system for raising tillage tools installed at opposite sides of a tractor. The pump P will be constantly driven from the tractor engine. A conduit (not shown) will lead from the valve port 93ª to a fluid-actuated motor (not shown) which is operably connected with the tillage tool on the right side of the tractor and operable when energized by the pressure of fluid subjected thereto to raise the tillage tool in opposition to the force of gravity. A second motor (not shown) is similarly associated with the tillage tool at the left side of the tractor and is connected by a conduit (not shown) with a port corresponding to the port 93ª in the valve passage 92.

It will be assumed that the tools are in their earth-working positions and that it is desired to simultaneously raise these tools above the ground to a transport position. Such raising of the tools is brought about by moving the control lever 119 backwardly in the slot 130 from the neutral position. While the lever 119 is in the slot 130, the loop 122 therein engages both bosses 114 upon the levers 112, wherefore both of these levers will be pivoted backwardly or counter-clockwise, as viewed in Figures 1, 6, and 8, causing both of the ball actuators 107 to unseat their balls 96 and 97 and thus open both valves of the device 60. Concurrently with this backward movement of the lever 119, it is operable through the link 66 to close the pump by-pass valve, which will be retained closed by the automatic latch mechanism including the plunger PL and the latch lever 77 described above. Thereupon the constantly driven pump will force fluid past the check valve 76—76' into the conduit 62 and thence into the channel 91ª in the valve mechanism 60 and forwardly through the passages 92 and 93 to the tool-lifting motors. When the motors reach their limit of operation concurrently with having raised the tools, a consequent rise in pressure of the pumped fluid will lift the cap 85 on the pressure relief valve 83 to pivot the latch lever 77 for unlatching the by-pass valve lever 79, whereupon the spring SP will pivot the levers 79 and 65 to respectively open the by-pass valve and concurrently exert a force in a forward direction upon the link 66 and the lever 119. The lever 119 is thus moved forwardly until the bosses 127ˣ and 127ʸ abut the stops 126ˣ and 126ʸ. Pressure fluid within the forward ends of the channels 92 and 93 will then seat the balls 97, and the check valve 76—76' in the pump will also become seated, cooperating with the balls 97 in providing a double check preventing the escape of the fluid from the motors and thereby maintaining the tools raised.

Should it be desired to lower both of the tools, the operator will press downwardly upon the handle of the lever 119 for displacing the lug formation 127ˣ—127ʸ beneath the stops 126ˣ and 126ʸ and move the lever forwardly in that part of the slot 130 ahead of the neutral position. Again the loop 122 in the lever engages both of the bosses 114 on the valve-actuating levers 112, causing both actuators 107 to be rotated for unseating both sets of valve balls 96—97. At the same time, the lever 119 is operable through the link 66, lever 79, its extension 87, and the axially movable pin 88 for opening the pump check valve, so the entire passage between the motors and the pump reservoir is cleared to permit the fluid in the motors, under the pressure developed therein by the gravitational force upon the tools, to escape back to the pump reservoir as the tools descend.

Should it be desired to cause only the tool at the right side of the tractor to be raised, the control lever 119 will be shifted sidewise while in the neutral position through the frame slot 127ᵇ (Figure 7) into the dotted line position shown in Figure 2, disengaging the loop 122 of this lever from the boss 114 of the left actuating lever 112. While the control lever 119 is in this tilted position within the slot 124, the loop 122 still embraces the boss 114 on the right actuating lever 112, so that, upon subsequent backward movement of the lever 119, the rightmost actuating lever 112 will be moved backwardly, rotating the valve ball actuator 107 associated therewith for unseating its valve balls 96 and 97. As before, the backwardly pulled lever 119 is operable through the link 66 to condition the pump for delivering fluid through the passage cleared by the unseating of the balls 96 and 97 in passage 93 with which the motor for raising the tool at the right side of the tractor is associated. Accordingly, that motor is energized and its tool at the right side of the tractor is raised. Since the balls 96 and 97 in the left-hand passage 92 were not unseated by the backward movement of the lever 119, the tool at the left-hand side of the tractor will remain down. Upon release of the control lever following the movement of it to the back end of the guide-frame slot 124, the same sequence of operations takes place as described above following movement of the lever to the back end of the center guide-frame slot 130, resulting in automatic return of the lever to the neutral position within the slot in which it is disposed and the opening of the pump bypass valve, while the pump check valve and the valve ball 97 prevent discharge of fluid from the actuated motor, whereby the tool is retained elevated. Subsequent forward movement of the control lever 119 in the slot 124, following downward movement of this lever to place the lug 127x below the stop 126y, will be effective through the link 66 and through the right-hand actuator 107 for unseating the pump check valve and the right-hand ball set 96—97, to permit the escape of fluid from the motor associated with the right-hand tool to the pump reservoir to permit this tool to drop to the ground-engaging position.

Operation for the left-hand tool involves the same operations as just explained with respect to the right-hand tool with the exception that the control lever 119 will be operated backwardly and forwardly in the left-hand guide-frame slot 129.

During slow adjustment of the tools while the throttling valve is set as illustrated in Figure 4, the excess fluid pumped by the pump can escape at high pressure through the relief valve (Figure 8).

An important operating feature of the present valve mechanism is its operation in correlation with the natural muscular reflexes of an operator, making a training period unnecessary for the operator. In the selection of a tool for operation, the operator will instinctively shift the control lever 119 toward the side of the machine where the tool is disposed and he will also instinctively thereafter push the lever forwardly and downwardly to lower the tool, or backwardly and upwardly to raise the tool. To lower and raise both tools, the operator instinctively performs the same fore and aft manipulations of the lever in the center guide slot of the frame 125.

While I have herein shown and described a preferred embodiment with the view of illustrating the invention, it should be understood that the invention extends to other forms, arrangements, structures and details falling within the scope and spirit thereof and not sacrificing all of its material advantages.

What is claimed is:

1. In a system for controlling the delivery of actuating fluid from a constant delivery pump to a motor actuated when subjected to the pressure of fluid delivered from the pump, the combination of a control valve, conduit means comprising a trunk portion communicating between the pump outlet and said valve and a portion communicating between said valve and the motor, a control member for said valve manipulative in opposite directions for establishing and terminating communication between the conduit portions, a by-pass valve operable when open to by-pass the pumped fluid from the pump and operable when closed to direct the pumped fluid into the trunk conduit portion under pressure, connecting means connecting the valve control member with the by-pass valve for closing the same when manipulated in the direction to establish said communication between the conduit portions and for opening the by-pass valve when manipulated in the direction for terminating such communication, means urging the control member in the communication terminating position, means for automatically releasably maintaining the control member in the communication establishing position, means responsive to a predetermined pressure of the pumped fluid for releasing the maintaining means to initiate manipulation of the control member to the communication terminating position by said urging means, and stop means normally limiting manipulation of the control member to the communication terminating position under the influence of said urging means, but said control member being manually manipulatable beyond said position to open the control valve for establishing communication between said conduit portions and said by-pass valve remaining open during the manual manipulation of the control member beyond the communication terminating position.

2. In a system for controlling the delivery of actuating fluid from a constant delivery pump to a motor actuated when subjected to the pressure of fluid delivered from the pump, the combination of a control valve, conduit means comprising a trunk portion communicating between the pump outlet and said valve and a portion communicating between said valve and the motor, a control member for said valve manipulative in opposite directions for establishing and terminating communication between the conduit portions, a by-pass valve operable when open to by-pass the pumped fluid from the pump and operable when closed to direct the pumped fluid into the trunk conduit portion under pressure, connecting means connecting the valve control member with the by-pass valve for closing the same when manipulated in the direction to establish said communication between the conduit portions and for opening the by-pass valve when manipulated in the direction for terminating such communication, means urging the control member in the communication terminating position, means for automatically releasably maintaining the control member in the communication establishing position, means responsive to a predetermined pressure of the pumped fluid for releasing the maintaining means to initiate manipulation of the control member to the communication terminating position by said urging means, a check valve in series with the trunk conduit portion to prevent discharge from the motor through the conduit means when closed, said control member being operable to open the control valve when manipulated back to and beyond the communication terminating position to reestablish such communication, and means operable under control of said control member to open said check valve pursuant to such manipulation beyond the communication terminating position.

3. In a system for controlling the delivery of actuating fluid from a constant delivery pump to a motor actuated when subjected to the pressure of fluid delivered from the pump, the combination of a control valve, conduit means comprising a trunk portion communicating between the pump outlet and said valve and a portion communicating between said valve and the motor, a control member for said valve manipulative in opposite directions for establishing and terminating communication between the conduit portions, a by-pass valve operable when open to by-pass the pumped fluid from the pump and operable when closed to direct the pumped fluid into the trunk conduit portion under pressure, connecting means connecting the valve control member with the by-pass valve for closing the same when manipulated in the direction to establish said communication between the conduit portions and for opening the by-pass valve when manipulated in the direction for terminating such communication, means urging the control member in the communication terminating position, means for automatically releasably maintaining the control member in the communication establishing position, means responsive to a predetermined pressure of the pumped fluid for releasing the maintaining means to initiate manipulation of the control member to the communication terminating position by said urging means, a check valve in series with the trunk conduit portion to prevent discharge from the motor through the conduit means when closed, said control member being operable to open the control valve when manipulated back to and beyond the communication terminating position to reestablish such communication, stop means normally limiting manipulation of the control member to the communication terminating position under the influence of said urging means, but said control member being manually manipulatable beyond said position to open the control valve without closing the by-pass valve, and means operable under control of said control member to open said check valve pursuant to such manipulation beyond said position.

4. In a system for controlling the delivery of actuating fluid from a constant delivery pump to a motor actuated when subjected to the pressure of fluid delivered from the pump, the combination of a control valve, conduit means comprising a trunk portion communicating between the pump outlet and said valve and a portion communicating between said valve and the motor, a control member for said valve manipulative in opposite directions for establishing and terminating communication between the conduit portions, a by-pass valve operable when open to by-pass the pumped fluid from the pump and operable when closed to direct the pumped fluid into the trunk conduit portion under pressure, connecting means connecting the valve control member with the by-pass valve for closing the same when manipulated in the direction to establish said communication between the conduit portions and for opening the by-pass valve when manipulated in the direction for terminating such communication, a check valve in series with the trunk conduit portion to prevent discharge from the motor through the conduit means when closed, said control member being operable to open the control valve when manipulated back to and beyond the communication terimnating position to reestablish such communication, and means operable under control of said control member to open said check valve pursuant to such manipulation beyond the communication terminating position.

5. In combination, a main valve mechanism conditionable to create a high fluid pressure condition therein, an auxiliary valve mechanism adjustable between open, neutral and exhaust positions and including a control element movable into corresponding positions to effect said adjustments, a conduit interconnecting said valve mechanisms to contribute to establishment of communication between the main valve and a place of discharge when the control element is in either the open position or the exhaust position, the auxiliary valve mechanism being in neutral and closed to preclude communication between the place of discharge and the main valve mechanism when the control element is in the neutral position, means connecting the control element with the main valve to condition the same for high pressure concurrently with movement of the control element into the open position, means responsive to a maximum of the fluid pressure in the main valve mechanism to terminate said high pressure condition and to move the control element into the neutral position, and said control member being thereafter operable, when moved into the exhaust position, to establish communication through said conduit between said place of discharge and the main valve mechanism without incurring the high pressure condition in such main valve mechanism.

CARL W. MOTT.

REFERENCES CITED

The following references are of record in the file of this patent:

UNITED STATES PATENTS

| Number | Name | Date |
|---|---|---|
| 2,265,260 | Argo | Dec. 9, 1941 |
| 2,298,267 | Alderman | Oct. 13, 1942 |
| 2,238,374 | Sallee | Apr. 15, 1941 |
| 2,243,364 | Trautman | May 27, 1941 |
| 2,324,866 | Mott | July 20, 1943 |
| 2,213,401 | Lindgren | Sept. 3, 1940 |
| 2,094,466 | Proctor | Sept. 28, 1937 |
| 1,968,422 | Proctor | July 31, 1934 |